UNITED STATES PATENT OFFICE.

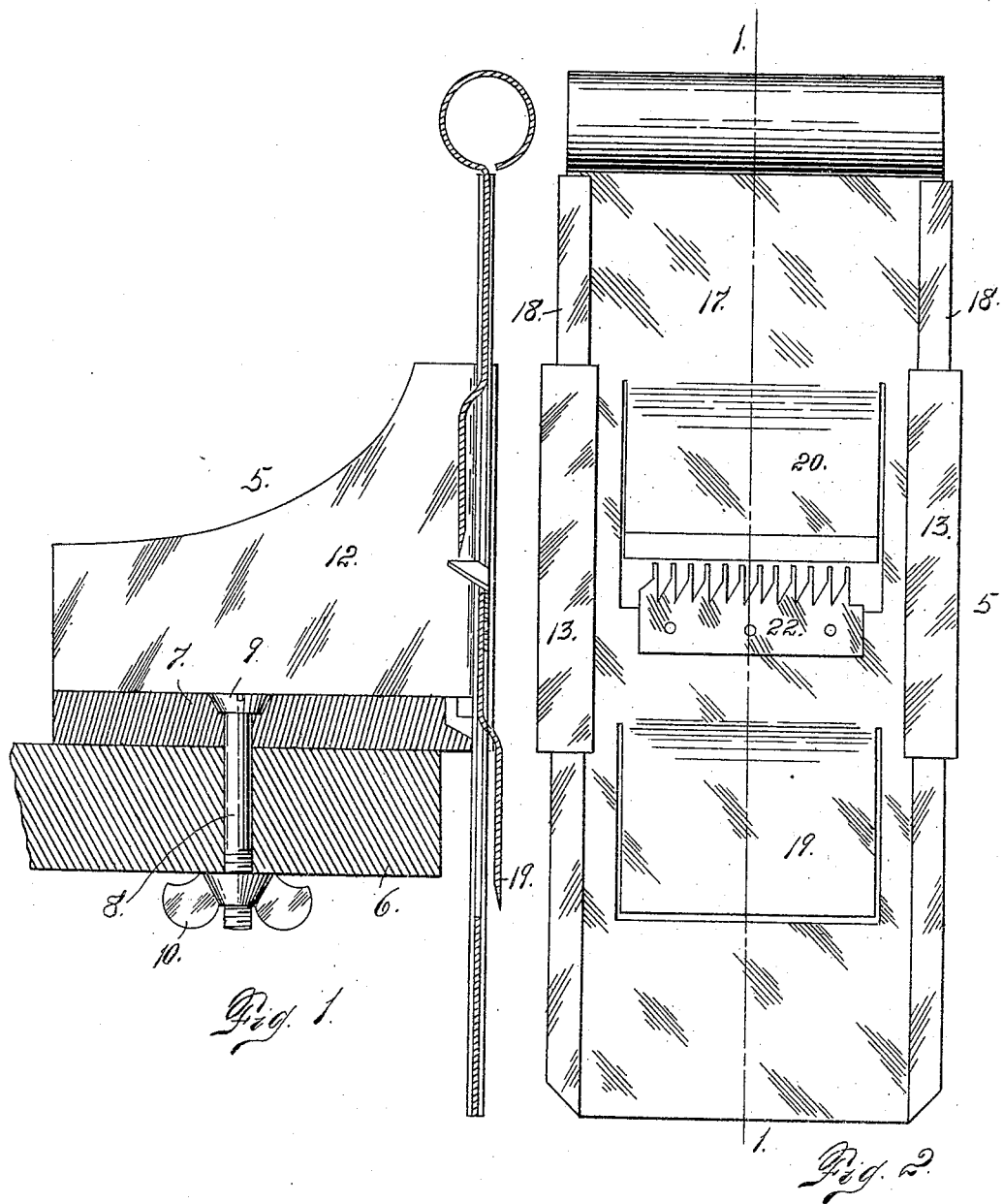

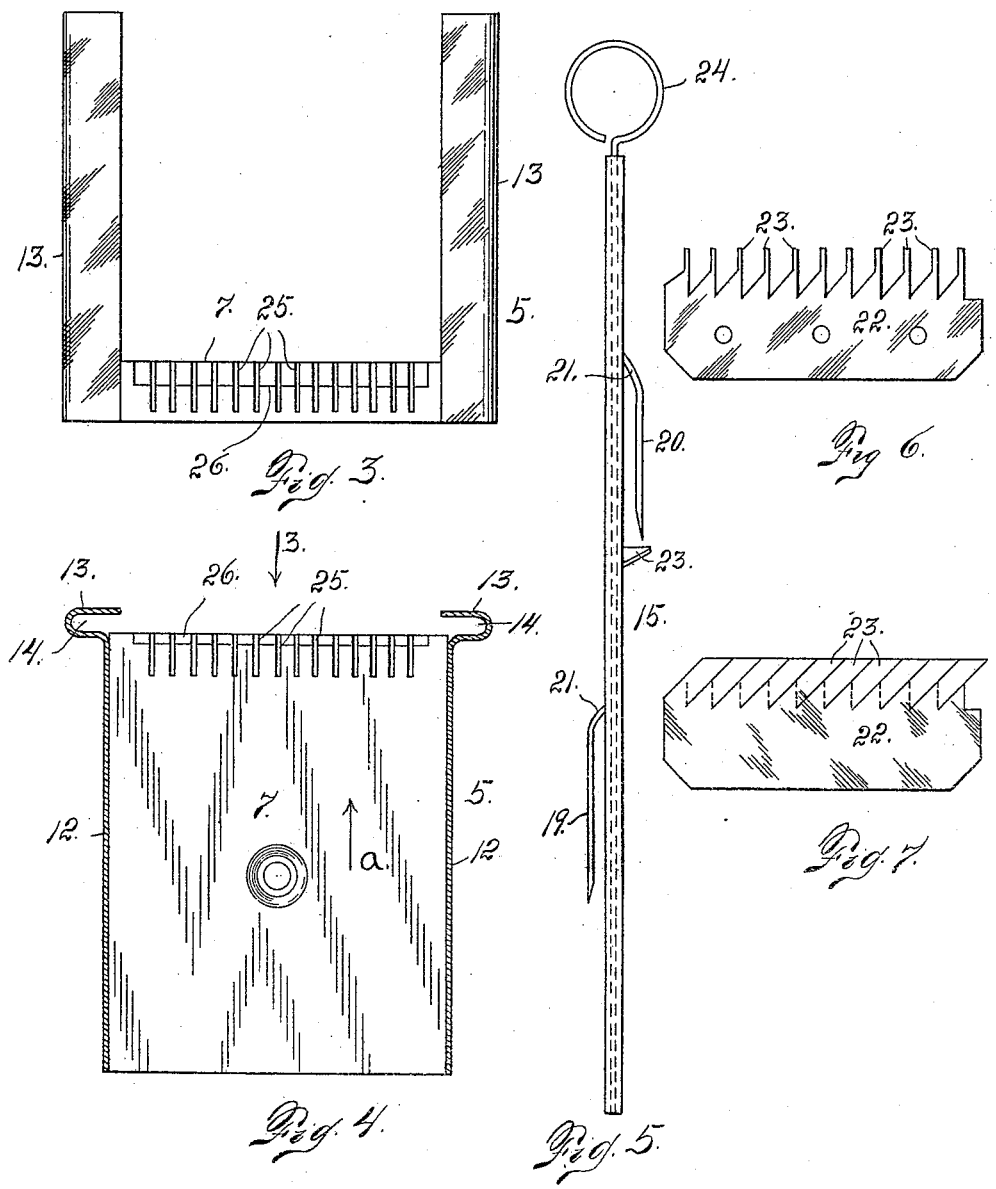

VINCENT JOHNSON, OF ASPEN, COLORADO.

VEGETABLE-SLICER.

940,252.

Specification of Letters Patent.   Patented Nov. 16, 1909.

Application filed October 19, 1907.   Serial No. 398,199.

*To all whom it may concern:*

Be it known that I, VINCENT JOHNSON, a citizen of the United States, residing at Aspen, in the county of Pitkin and State of Colorado, have invented certain new and useful Improvements in Vegetable-Slicers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vegetable slicers and consists of a stationary body part having a bottom and upwardly projecting sides, the latter having vertically disposed ways adapted to receive a plate adapted to vertically reciprocate for vegetable cutting purposes, the vegetables being placed upon the bottom of the body part and fed forwardly to the cutters with which the plate is provided. This plate is equipped on one side with a blade for cutting vegetables into thin slices while on the opposite side it is provided with a similar blade and a series of coöperating vertically disposed knives for cutting the vegetables as potatoes into strings, being equipped with one broad blade to perform the slicing function and a series of small coöperating blades to simultaneously form the slices into strings. After using the device to perform one of the aforesaid functions, if it is desired to perform the other function, it is only necessary to remove the slicer plate and reverse the same. The bottom of the stationary part, is shaped to coöperate with the cutter blades in the performance of their function.

Having briefly outlined my improved construction, I will proceed to describe the same in detail reference being made to the accompanying drawing in which is illustrated an embodiment thereof.

In this drawing, Figure 1 is a vertical longitudinal section of my improved device taken on the line 1—1 Fig. 2. Fig. 2 is a rear elevation of the same. Fig. 3 is a rear view of the stationary body member, or a view looking in the direction of arrow 3 Fig. 4. Fig. 4 is a horizontal section taken through the body part of the device above the bottom thereof, looking downwardly. In this view the slicer is not illustrated. Fig. 5 is an edge view of the vertically reciprocating slicer. Fig. 6 is a detail elevation of a removable blade for cutting the vegetables into strings. Fig. 7 is a similar view of the plank from which the said device is formed.

The same reference characters indicate the same parts in all the views.

Let the numeral 5 designate a relatively stationary body member, adapted to be secured to a suitable stationary support 6. As shown in the drawing the bottom 7 of this member is provided with a screw 8 having a countersunk head 9, the said screw passing through an opening formed in the stationary part 6. The lower threaded extremity of the screw protrudes through the part 6 and as shown in the drawing is secured by a winged nut 10. The body part, however, may be secured in any other suitable manner. To the bottom 7 of this body part are attached upwardly projecting side walls 12 whose rear extremities are shaped as shown at 13 to form ways 14 adapted to receive the opposite edges of the vertically reciprocating slicer 15, consisting of a plate 17, whose opposite edges are reinforced as shown at 18. This plate 17 is provided near its lower portion with a slicer blade 19, which as shown in the drawing is formed integral with the plate. In the formation of this blade, parallel vertically disposed slits are formed in the plate and their lower extremities are intersected by a transverse slit. The metal bounded by these slits is then pressed out of the plane of the plate, on the side toward the body part, assuming that the slicer is in position to utilize this blade for slicing purposes. In the upper portion of the plate is a similar blade 20 formed in precisely the same manner but pressed outwardly in the opposite direction. Both of these blades are connected with the body of the plate at their upper extremities, the blade being offset as shown at 21 in each instance. Where these blades are pressed out of the plate, openings are of course formed therein to permit the sliced vegetables to escape during the slicing operation. Secured to the slicer plate is a third blade 22, the same being attached just below the lower edge of the blade 20. The upper edge of this blade 22 of this third blade is formed into a series of short cutters 23 projecting below the lower edge of the knife 20 and coöperating therewith to form the vegetables into strings.

The upper extremity of the slicer plate is provided with a handle 24 preferably formed integral with the plate by bending the same into cylindrical form.

The forward extremity of the bottom 7 of the body of the device, is provided with a series of kerfs or grooves 25, adapted to receive the short blades 23. The forward extremity of this bottom is also provided with a shoulder 26, adapted to be engaged by the lower edge of the slicer blade 19.

From the foregoing description the use of my improved device will be readily understood. Assuming that the vegetables are to be cut into thin slices, the slicer plate is inserted in the ways 14, with the blade 19 foremost or toward the bottom 7. The vegetable to be sliced is then fed toward the blade as indicated by the arrow *a* in Fig. 4, the plate being reciprocated vertically for slicing purposes. Now if it is desired to cut the vegetables into strings in addition to performing the slicing function, the plate 15 is removed or lifted out of the grooved ways of the body part, and its position reversed whereby the blade 20 and the coöperating blade 22 extend forwardly toward the bottom provided with a series of grooves 25 as heretofore explained. The vegetable operated upon is then fed forwardly toward the slicer blade, the plate carrying the blades being reciprocated vertically to perform the required function. As the vegetables are sliced or sliced and cut into strings, the slices in the one case, and the strings in the other case pass rearwardly through the openings formed in the plate where the blades 19 and 20 are located.

Having thus described my invention, what I claim is:

1. A vegetable slicer comprising a relatively stationary body part having vertically disposed guides, a slicing plate adapted to engage said guides, the said plate having upper and lower openings formed therein, and blades formed integral with the said plate, and offset adjacent said openings in opposite directions, the said blades having horizontally arranged cutting edges, the slicing plate having a cutter provided with a series of coöperating, vertically disposed knives extending below the lower edge and crosswise of one of the slicing blades, the body part of the slicer having a bottom whose forward extremity is fashioned to coöperate with the slicing blades and knives, substantially as described.

2. A vegetable slicer, comprising a relatively stationary body part having vertically disposed guides, a slicing plate adapted to engage said guides, the said plate having upper and lower openings formed therein, and blades formed integral with the said plate and offset adjacent said openings in opposite directions, the said blades having horizontally arranged cutting edges, the slicing plate having a cutter provided with a series of coöperating vertically disposed knives extending below the lower edge and crosswise of one of the slicing blades, the cutting edges of the knives being inclined to produce a shearing action, the body part of the slicer having a bottom whose forward extremity is fashioned to coöperate with the slicing blades and knives, substantially as described.

In testimony whereof I affix my signature in presence of two witnesses.

VINCENT JOHNSON.

Witnesses:
A. J. O'BRIEN,
DENA NELSON.